United States Patent
Takeda

(10) Patent No.: US 8,525,482 B2
(45) Date of Patent: Sep. 3, 2013

(54) OVERCURRENT PROTECTION CIRCUIT FOR CONNECTING A CURRENT DETECTION TERMINAL TO OVERCURRENT DETECTION RESISTORS HAVING DIFFERENT RESISTANCES

(75) Inventor: Takashi Takeda, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 372 days.

(21) Appl. No.: 12/617,755

(22) Filed: Nov. 13, 2009

(65) Prior Publication Data
US 2010/0123437 A1  May 20, 2010

(30) Foreign Application Priority Data
Nov. 19, 2008 (JP) .................... 2008-295744

(51) Int. Cl.
*H02J 7/00* (2006.01)
(52) U.S. Cl.
USPC ................. 320/136; 320/127; 320/164
(58) Field of Classification Search
USPC ......................................... 302/136
See application file for complete search history.

(56) References Cited

U.S. PATENT DOCUMENTS

| 6,031,358 | A  | * | 2/2000  | Shirakawa et al. | 320/136 |
| 6,198,255 | B1 | * | 3/2001  | Yoshida | 320/134 |
| 6,812,673 | B2 | * | 11/2004 | Fujiwara | 320/136 |
| 7,535,283 | B2 | * | 5/2009  | Kojima | 327/538 |
| 7,584,370 | B2 | * | 9/2009  | Zhao | 713/300 |
| 7,656,126 | B2 | * | 2/2010  | Sato | 320/134 |
| 2001/0028571 | A1 | | 10/2001 | Hanada et al. | |
| 2008/0304197 | A1 | * | 12/2008 | Higashi | 361/93.7 |
| 2009/0251104 | A1 | | 10/2009 | Yamamoto et al. | |

FOREIGN PATENT DOCUMENTS
JP       2007-325434       12/2007

* cited by examiner

*Primary Examiner* — Arun Williams
(74) *Attorney, Agent, or Firm* — IPUSA, PLLC

(57) ABSTRACT

An overcurrent protection circuit of a rechargeable battery includes a current detection terminal and an overcurrent return resistor connecting part. A voltage converted from a discharge current of the rechargeable battery is detected at the current detection terminal. The overcurrent return resistor connecting part connects the current detection terminal to overcurrent detection resistors having different resistances in accordance with a level of the voltage detected at the current detection terminal when the voltage detected at the current detection terminal is equal to or greater than a discharge overcurrent detection voltage and a discharge overcurrent state in which an overcurrent flows from the rechargeable battery is detected.

5 Claims, 4 Drawing Sheets

OVERCURRENT PROTECTION CIRCUIT FOR CONNECTING A CURRENT DETECTION TERMINAL TO OVERCURRENT DETECTION RESISTORS HAVING DIFFERENT RESISTANCES

CROSS-REFERENCE TO RELATED APPLICATIONS

This application is based upon and claims the benefit of priority of the prior Japanese Patent Application No. 2008-295744, filed on Nov. 19, 2008, the entire contents of which are incorporated herein by reference.

BACKGROUND OF THE INVENTION

1. Field of the Invention

The present invention relates to an overcurrent protection circuit that protects a rechargeable battery from an overcurrent.

2. Description of the Related Art

Conventionally, there is known a protection circuit of a rechargeable battery such as a lithium ion battery or a lithium-polymer battery. FIG. 1 is a circuit diagram of a protection circuit of a rechargeable battery that is generally used. In FIG. 1, a protection package 300 includes a rechargeable battery CELL, connection terminals P+ and P−, and a protection circuit 250. The protection circuit 250 includes an integrated circuit 120 for protecting a rechargeable battery, external resistors R1 and R2, a capacitor C1, a charge control MOS (Metal Oxide Semiconductor) transistor M11, and a discharge control MOS transistor M12.

An N-channel MOSFET (Metal Oxide Semiconductor Field Effect Transistor) having an on-resistance of several tens milliohms is used for each of the charge control MOS transistor M11 and the discharge control MOS transistor M12 in order to monitor charge and discharge currents at a current detection terminal V− by converting the charge and discharge currents into voltages according to the on-resistance and detecting the voltages at the current detection terminal V−. An operation of the charge control MOS transistor M11 is controlled by a voltage at a COT terminal to protect the rechargeable battery CELL by being turned off in an over charge state or an abnormal charger connected state (charge overcurrent state). An operation of the discharge control MOS transistor M12 is controlled by a voltage at a DOUT terminal to protect the rechargeable battery CELL by being turned off in an over discharge state, a discharge overcurrent state or an output short-circuit state. The overcurrent state and the over discharge state can be detected by monitoring a voltage at a VDD terminal.

Here, when a load RL is connected to the battery pack 300 and a discharge current Id flows, a potential Vd at the current detection terminal V− is acquired as Vd=Id×Ron, where Ron is a total value of the on-resistances of the charge control MOS transistor M11 and the discharge control MOS transistor M12. If the discharge current Id increases and the voltage at the current detection terminal V− exceeds a discharge overcurrent detection voltage, the DOUT terminal outputs a low-level signal to turn off the discharge control MOS transistor M12, which results in a discharge overcurrent detection state being set.

At this time, the current detection terminal V− is pulled down to a VSS terminal and pulled in by an overcurrent return resistance RS5 having a resistance of about several tens [kΩ] to several hundreds [kΩ]. Thereby, when the load RL is released, the potential at the current detection terminal V− becomes smaller than discharge overcurrent detection voltage, which permits returning from the overcurrent protection state to a normal state.

In addition, there is suggested a charge and discharge protection circuit, which permits an efficient quick charge (for example, refer to Patent Document 1). The charge and discharge protection circuit includes an overcharge detection circuit, an over discharge detection circuit, a charge overcurrent detection circuit, a discharge overcurrent detection circuit, and a charge control FET and a discharge control FET connected to a charge and discharge circuit in series. The charge and discharge protection circuit protects a rechargeable battery from an overcharge, an over discharge, a charge overcurrent or a discharge overcurrent by turning off the charge control FET when the overcharge detection circuit detects an overcharge and when the charge overcurrent detection circuit detects a charge overcurrent, and by turning off the discharge control FET when the over discharge detection circuit detects an over discharge and when the discharge overcurrent detection circuit detects a discharge overcurrent. The charge and discharge protection circuit forcibly turns on the discharge control FET after a predetermined time has passed if a charger is connected when an over discharge is detected in order to suppress deterioration of the discharge control EFT due to a charge returning from a parasitic diode of the discharge control FET.

Patent Document: Japanese Laid-Open Patent Application No. 2007-325434

However, in the conventional technique illustrated in FIG. 1, because the resistance of the load RL is normally much larger than the resistance of the overcurrent return resistor RS5, the potential Vd at the current detection terminal V− is nearly equal to a potential at a connection terminal P+(Vd≈P+ (=VDD)). Here, a leakage current flows from the connection terminal P+ to VSS (ground potential) through the above-mentioned overcurrent return resistor RS5. If it is assumed, for example, that VDD=4.0 [V] and RS5=50 [kΩ], the leakage current Ileak is 77 [μA]. Because the current consumption of the rechargeable battery protection integrated circuit 120 is at a level of several microampares [μA], the value of the leakage current Ileak is very large relative to the current consumption of the rechargeable battery protection integrated circuit 120. That is, a large leakage current Ileak flows although the rechargeable battery is protected by the protection circuit 25, which raises a problem in that a service life of the rechargeable battery CELL is reduced.

As measures for preventing such a reduction in the service life of the rechargeable battery CELL, it is considered to reduce the leakage current Ileak by increasing the resistance of the overcurrent return resistance RS5. FIG. 2 is a circuit diagram of a part of the protection circuit 250 of the rechargeable battery CELL including the overcurrent return resistor RS5 and elements associated with the overcurrent return resistor RS5. In FIG. 2, if the resistance of the overcurrent return resistor RS5 is simply increased, the potential Vd at the current detection terminal V− is increased due to a current Iv− flowing into the current detection terminal V−. Thus, the potential Vd at the current detection terminal V− becomes larger than the discharge overcurrent detection voltage, which raises a problem in that it cannot return from the discharge overcurrent protection state. For example, if it is assumed that the current Iv− flowing into the overcurrent return resistor RS5 from the current detection terminal V− is 500 [nA] and the discharge overcurrent detection voltage is 100 [mV], the maximum value of the resistance of the overcurrent return resistor SR5 is 200 [kΩ]. Thus, it is appreciated that there is a restriction in simply increasing the resistance of the overcurrent return resistor RS5.

Additionally, in the structure disclosed in the above-mentioned Patent Document 1, the above-mentioned problem associated with the leakage current Ileak is not considered, and, thus, there is a problem in that a large current flows in the overcurrent protection state.

SUMMARY OF THE INVENTION

It is a general object of the present invention to provide an overcurrent protection circuit of a rechargeable battery, in which the above-mentioned problems are eliminated.

A more specific object of the present invention is to provide an overcurrent protection circuit of a rechargeable battery, which suppresses a leakage current when a discharge overcurrent is detected.

In order to achieve the above-mentioned object, there is provided an overcurrent protection circuit of a rechargeable battery, comprising: a current detection terminal at which a voltage converted from a discharge current of the rechargeable battery is detected; and an overcurrent return resistor connecting part that connects the current detection terminal to overcurrent detection resistors having different resistances in accordance with a level of the voltage detected at the current detection terminal when the voltage detected at the current detection terminal is equal to or greater than a discharge overcurrent detection voltage and a discharge overcurrent state in which an overcurrent flows from the rechargeable battery is detected.

According to the present invention, a leakage current flowing when the discharge overcurrent of the rechargeable battery is detected can be suppressed.

Other objects, features and advantages of the present invention will become more apparent from the following detailed description when read in conjunction with the accompanying drawings.

DETAILED DESCRIPTION OF THE PREFERRED EMBODIMENTS

A description will be given below, with reference to the drawings, of embodiments according to the present invention.

Figure 3:
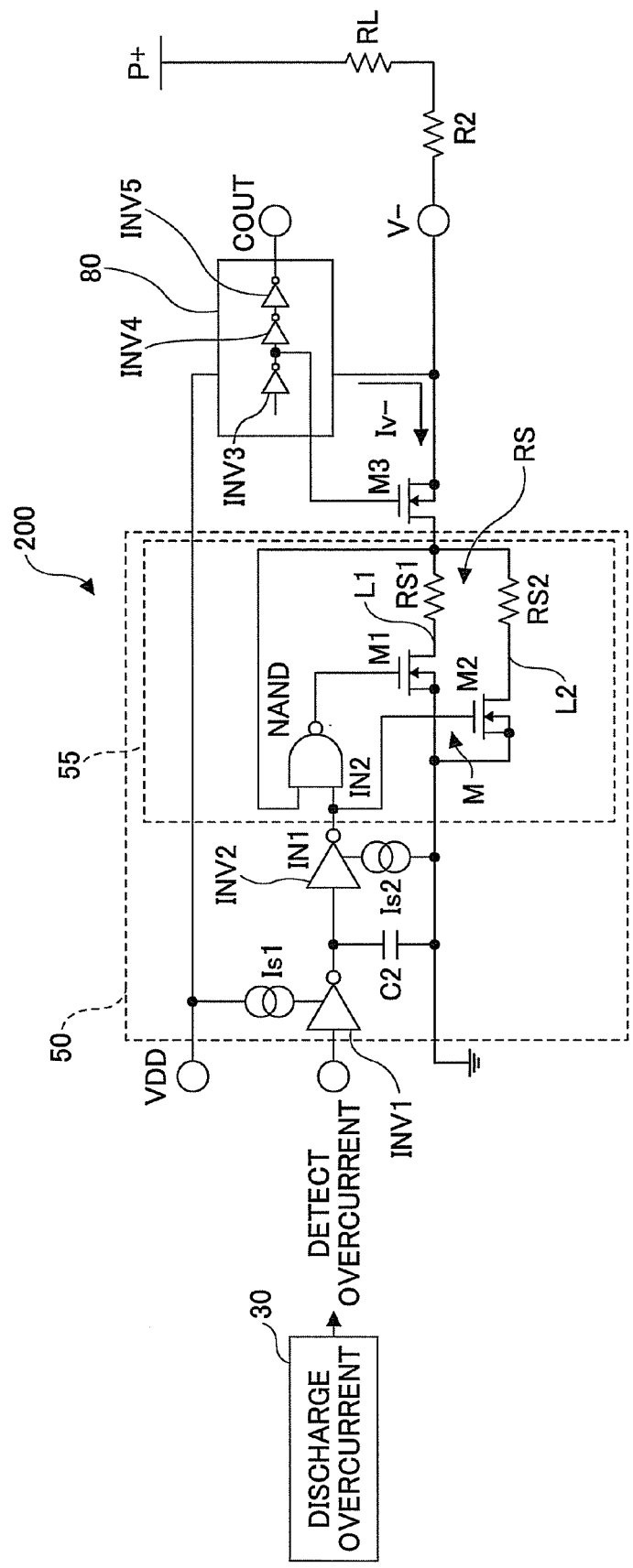
FIG. 3 is a circuit diagram of an overcurrent protection circuit of a rechargeable battery according to an embodiment of the present invention.

FIG. 3 is a circuit diagram of an overcurrent protection circuit 200 of a rechargeable battery CELL according to an embodiment of the present invention. The overcurrent protection circuit 200 of the rechargeable battery CELL includes a current detection terminal V− and an overcurrent return resistor connecting part 55. The overcurrent protection circuit 200 of the rechargeable battery CELL according to the present embodiment may include, as associated structural elements, a discharge control logic circuit containing the overcurrent return resistor connecting part 55, a discharge overcurrent detection circuit 30, a charge control logic circuit 80, a third switching element M3, a charge control terminal COUT, a VDD terminal, a connection terminal P+, and a load RL.

Figure 1:
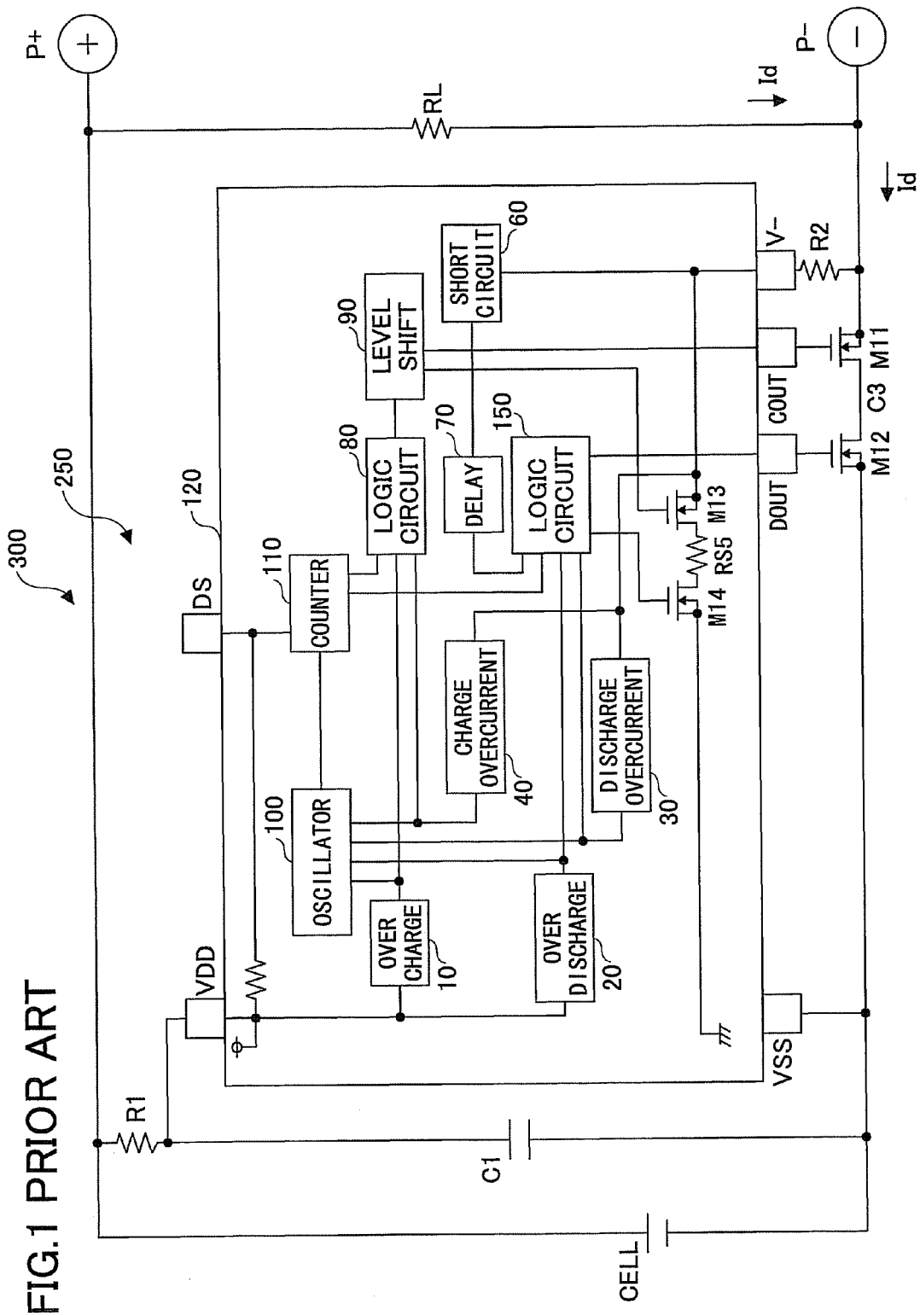
FIG. 1 is a circuit diagram of a protection circuit of a rechargeable battery that is generally used.
Figure 2:
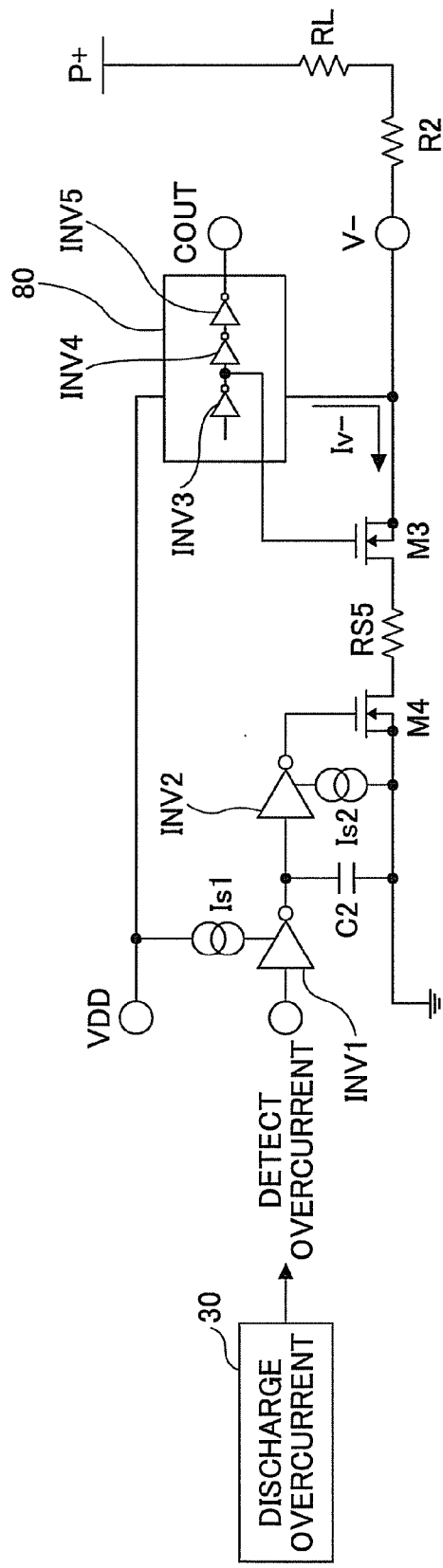
FIG. 2 is a circuit diagram of a part of the protection circuit of the rechargeable battery including an overcurrent return resistor and elements associated with the overcurrent return resistor.

Although FIG. 3 illustrates structures different from the structure illustrated in FIG. 1, the overcurrent protection circuit 200 of the rechargeable battery CELL according to the present embodiment may have a structure and a function to protect the rechargeable battery CELL by detecting an overcharge state, an abnormal charger connection state (a charge overcurrent state), an over discharge state and an output short-circuit state explained above in association with the protection circuit 250 of the rechargeable battery CELL. That is, the overcurrent protection circuit 200 according to the present embodiment may be provided with the over charge detection circuit 10, the over discharge detection circuit 20, the charge overcurrent detection circuit 40, the short-circuit detection circuit 60, the delay circuit 70, the level shift circuit 90, the oscillator 100, and the counter 110 in the rechargeable battery protection integrated circuit, that are illustrated in FIG. 1. Additionally, the rechargeable battery protection integrated circuit including the overcurrent protection circuit 200 of the rechargeable battery CELL according to the present embodiment may be provided with the VSS terminal connected to a negative electrode of the rechargeable battery CELL, the discharge control terminal DOUT for controlling a discharge of the rechargeable battery CELL, and a delay time reduction terminal DS for reducing a delay time during an inspection. Further, the rechargeable battery protection module including the overcurrent protection circuit 200 of the rechargeable battery CELL according to the present embodiment may be provided with the external MOS transistors M11 and M12, the resistors R1 and R2, and the capacitor C1.

Returning to FIG. 3, a description will be given below of each structural element of the circuit illustrated in FIG. 3.

The current detection terminal V− is connected to the negative electrode of the rechargeable battery CELL and the negative electrode of the charger to detect a voltage converted from a charge current and a discharge current of the rechargeable battery CELL. A positive voltage is detected at the current detection terminal V− during a discharging operation. A negative voltage is detected at the current detection terminal V− during a charging operation. In the overcurrent protection circuit 200 of the rechargeable battery CELL according to the present embodiment, because the current detection terminal V− performs a protection operation when a discharge overcurrent state is detected, the protection operation is performed when a positive voltage is detected at the current detection terminal V−.

The external resistor R2 may be connected to the current detection terminal V−, if needed. The overcurrent protection circuit of the rechargeable battery CELL according to the present embodiment operates in a state where a discharge overcurrent flows due to the load RL being connected to the connection terminals P+ and P−. Thus, FIG. 3 illustrates a state where the external resistor R2, the load RL and the connection terminal P+ are connected to the current detection terminal V−.

The discharge overcurrent detection circuit 30 detects a discharge overcurrent state of the rechargeable battery CELL, when the potential Vd at the current detection terminal V− is equal to or higher than a predetermined discharge overcurrent detection voltage. In FIG. 3, although the current detection terminal V− is not connected to the electric discharge overcurrent detection circuit 30, actually as illustrated in FIG. 1, the potential detected at the current detection terminal V− is supplied to the discharge overcurrent detection circuit 30. In the discharge overcurrent detection circuit 30, it is determined whether a voltage detected at the current detection terminal V− is equal to or higher than the predetermined discharge overcurrent detection voltage, as mentioned above. For example, it may also be determined whether the state where the voltage is equal to or higher than the discharge overcurrent detection voltage lasts for a predetermined delay time or more in order to make a determination that the discharge overcurrent detection state is set if the state where the voltage is equal to or higher than the discharge overcurrent detection voltage lasts for a predetermined delay time or more. When the discharge overcurrent detection circuit 30 detects the discharge overcurrent state of the rechargeable battery CELL, an overcurrent detection signal is output.

The discharge control logic circuit 50 includes an overcurrent return resistor connection part 55 (means for connecting an overcurrent return resistor) in order to connect the overcurrent return resistor RS when a discharge overcurrent state is detected by the discharge overcurrent detection circuit 30. Additionally, the discharge control logic circuit 50 may control ON/OFF of the discharge control MOS transistor M12 by controlling a signal output from the discharge control terminal DOUT when a discharge overcurrent state is detected and if the external discharge control MOS transistor M12 (refer to FIG. 1) is connected to the discharge control terminal DOUT.

The discharge control logic circuit 50 includes a current source part including a first current source Is1 and a second current source Is2, an inverter part including a first inverter INV1 and a second inverter INV2, a capacitor C2, and the overcurrent return resistor connection part 55. The overcurrent return resistance connection part 55 includes a NAND gate NA, a switching part M including a first switching element M1 and a second switching element M2, and the overcurrent return resistor RS including a first overcurrent return resistor RS1 and a second overcurrent return resistor RS2.

The inverter part including the first and second inverters INV1 and INV2 may be formed as a CMOS (Complementary Metal Oxide Semiconductor) inverter in which gates and drains of a high potential side P-channel MOS transistor (not illustrated in the figure) and a low potential side N-channel MOS transistor (not illustrated in the figure) are connected with each other. The current source part also includes the first and second current sources Is1 and Is2.

The output from the discharge overcurrent detection circuit 30 is input to the first inverter INV1. The first current source Is1 is connected between the P-channel MOS transistor of the first inverter INV1 and the VDD terminal. Thereby, the threshold voltage of the first inverter INV1 can be reduced lower than VDD/2 to change into the threshold potential Vthn of the N-channel MOS transistor. The output from the first inverter INV 1 is input to the second inverter INV1. The second current source Is2 is connected between the N-channel MOS transistor of the second inverter INV2 and the VSS terminal (GND). Thereby, the threshold voltage of the second inverter INV2 can be changed into the threshold potential Vthp of the second inverter INV2 to set the threshold voltage of the second inverter INV2 higher than VDD/2.

As mentioned above, the overcurrent detection signal detected by the overcurrent detection circuit 30 is inverted while being wave-shaped by the first inverter INV1 and also inverted while being wave-shaped by the second inverter INV2. Accordingly, if the overcurrent detection signal output from the overcurrent detection circuit 30 is at a high level, a high-level signal is output from the second inverter INV2, and if the overcurrent detection signal output from the discharge overcurrent detection circuit 30 is at a low level, a low-level signal is output from the second inverter INV2. In the present embodiment, a description is given of a case where a high-level signal is output from the discharge overcurrent detection circuit 30 and input to the inverter INV1 when a discharge overcurrent state is detected by the discharge overcurrent detection circuit 30.

The overcurrent return resistance connection part 55 is a means for connecting current detection terminal V− to the overcurrent return resistor part RS, when a discharge overcurrent state is detected by the discharge overcurrent detection circuit 30. The overcurrent return resistance connection part 55 includes the overcurrent detection NAND gate NA, the switching means M and the overcurrent return resistor part RS. The switching means M includes the first switching element M1 and the second switching element M2. The overcurrent return resistor RS also includes the first overcurrent return resistor RS1 and the second overcurrent return resistor RS2. The first switching element M1 is directly connected to the first overcurrent return resistor RS1 in series to form a first branch line L1. The second switching element M2 is directly connected to the second overcurrent return resistor RS2 in series to form a second branch line L1.

The first switching element M1 and the second switching element M2 can be any switching element. For example, an analog switch or a bipolar switch may be used as the first switching element M1 and the second switching element M2. In the present embodiment, a description will be given of a case where an N-channel MOS transistor is used as the first switching element M1 and the second switching element M2. Hereinafter, the first switching element M1 may be referred to as a first MOS transistor M1, and the second switching element M2 may be referred to as a second MOS transistor M2.

The NAND gate NA is a logic operation part having two inputs and one output to perform an AND operation. In FIG. 3, one of the two inputs of the NAND gate NA is referred to as a first input IN1, and the other is referred to as a second input IN2. In the overcurrent protection circuit of the rechargeable battery CELL according to the present embodiment, the output of the second inverter INV2 is connected to the second input IN2 and also connected to a gate, which is a switching control input of the second MOS transistor M2. That is, the output signal of the second inverter INV2 is input to the second input IN2 of the NAND gate NA and also input to the gate of the second MOS transistor M2 in order to control ON/OFF of the second MOS transistor M2.

The first input IN1 of the NAND gate NA is connected to the current detection terminal V− via a third switching element M3. Thereby, when the third switching element M3 is ON, the voltage at the current detection terminal V− is input to the first input IN1 of the NAND gate NA. Although an N-channel MOS transistor is used as the third switching element M3 in the present embodiment, other switching elements may be used according to an application. Hereinafter, the third switching element M3 may be referred to as a third MOS transistor.

The output of the NAND gate NA is connected to a gate, which is a switching control input of the first MOS transistor M1. That is, the output signal of the NAND gate NA controls ON/OFF of the first MOS transistor M1.

The first branch line L1 including the first overcurrent return resistor RS1 and the first MOS transistor M1 and the second branch line L2 including the second overcurrent return resistor RS2 and the second MOS transistor M2 are connected by parallel connection to the current detection terminal V−. Thus, when the first MOS transistor M1 is ON, the first overcurrent return resistor RS1 is connected to the current detection terminal V−. On the contrary, when the first MOS transistor M1 is OFF, the first overcurrent return resistor RS1 is disconnected from the current detection terminal V−. Similarly, when the second MOS transistor M2 is ON, the second overcurrent return resistor RS2 is connected to the current detection terminal V−. On the contrary, when the second MOS transistor M2 is OFF, the second overcurrent return resistor RS2 is disconnected from the current detection terminal V−.

As mentioned above, by providing the first and second overcurrent return resistors RS1 and RS2 in the first and second branch lines L1 and L2 connected to the current detection terminal V−, respectively, and also providing the first and second switching elements M1 and M2 in the first and second branch lines L1 and L2, respectively, the first return resistor RS1 alone, the second return resistor RS2 alone, or both the first and second return resistor RS1 and RS2 in parallel can be selectively connected to the current detection terminal V−. Therefore, if the resistance of the first overcurrent return resistor RS1 and the resistance of the second overcurrent return resistor RS2 are set to different values, an appropriate resistance achieved by the overcurrent return resistors RS1 and RS2 can be connected to the current detection terminal V− according to a level of the voltage at the current detection terminal V−. In the overcurrent protection circuit of the rechargeable battery CELL according to the present embodiment, the resistance of the first overcurrent return resistor RS1 is set as small as several tens [kΩ] and the resistance of the second overcurrent return resistor RS2 is set as large as from several hundreds [kΩ] to several [MΩ]. The value of the resistances of the first and second return resistor RS1 and RS2 will be explained in detail later.

The charge control logic circuit 80 determines whether the rechargeable battery CELL is in an over charge state based on a terminal voltage detected at the VDD terminal, and outputs a control signal to the charge control terminal COUT in order to control the charge control MOS transistor M11 when the charge control MOS transistor M11 (refer to FIG. 1) is connected externally to the charge control terminal COUT. For example, when the voltage detected at the VDD terminal is higher than a predetermined over charge detection voltage and an over charge state of the rechargeable battery CELL is detected, the charge control logic circuit 80 causes the charge control terminal COUT to output a low-level signal in order to turn off the external charge control MOS transistor M11 to stop a charge operation. On the other hand, when the rechargeable battery CELL is in a chargeable or dischargeable state, a high-level signal is always output from the charge control logic circuit 80 to the charge control terminal COUT. Although not illustrated in FIG. 3, the control signal of the charge control logic circuit 80 may be output through the level shift circuit 90 such as illustrated in FIG. 1.

The charge control logic circuit 80 performs an ON/OFF control of the third switching element M3. In FIG. 3, there are three inverters INV3, INV4 and INV5, and the gate of the third MOS transistor M3 is connected to a point between the third inverter INV3 and the fourth inverter INV4. Thus, if the control signal output to the charge control terminal COUT is at a high level, the high-level signal is input to the third MOS transistor M3, and if the control signal output to the charge control terminal COUT is at a low level, the low-level signal is input to the third MOS transistor M3. That is, if the rechargeable battery CELL is in a chargeable state, the high-level signal is supplied to the gate of the third MOS transistor M3 because the high-level signal is output from the charge control terminal COUT, thereby maintaining the ON state of the third MOS transistor M3.

Next, a description will be given of an operation of the over charge protection circuit 200 of the rechargeable battery CELL according to the present embodiment. In FIG. 3, when the load RL is connected and a discharge overcurrent flows, the voltage at the current detection terminal V− rises, and if the voltage Vd at the current detection terminal V− becomes higher than a predetermined overcurrent detection voltage, a discharge overcurrent state is detected by the discharge overcurrent detection circuit 30. Therefore, a high-level signal is input to the input of the first inverter INV1 of the discharge control logic circuit 50. At this time, because the high-level signal is inverted twice by the first inverter INV1 and the second inverter INV2, the signal input to the second input IN2 of the NAND gate NA is at a high level. Additionally, the second MOS transistor M2 is turned on.

Here, taking the charge control terminal COUT into consideration, the charge control terminal COUT is outputting a high-level signal because an over charge state never occurs in the discharge overcurrent detection state. Thereby, the third MOS transistor M3 is always in an ON state. Thus, the input signal to the first input IN1 of the NAND gate NA is at a voltage level of the voltage Vd detected at the current detection terminal V−.

When the input signal Vd input to the first input IN1 of the NAND gate NA is smaller than a threshold value Vthna of the NAND gate NA, the output of the NAND gate NA is at a high level because the low-level input signal is input to the first input IN1 and the high-level input signal is input to the second input IN2 of the NAND gate NA. Thereby, both the first MOS transistor M1 and the second MOS transistor M2 are turned on. Thus, the overcurrent return resistor RS is a combination of the first and second overcurrent return resistors RS1 and RS2, and the resistance of the overcurrent return resistor RS can be calculated as RS=(RS1×RS2)/(RS1+RS2).

On the other hand, if the input signal Vd input to the first input IN1 of the NAND gate NA is larger than the threshold value Vthna of the NAND gate NA, the output of the NAND gate NA is at a low level because the high-level input signal is input to the first input IN1 and the low-level input signal is input to the second input IN2 of the NAND gate NA. Thereby, the first MOS transistor M1 is turned off and the second MOS transistor M2 is turned on. Thus, the resistance of the overcurrent return resistor RS is equal to the resistance of the second return resistor RS2 (RS=RS2).

Accordingly, if the resistance of the first overcurrent return resistor RS1 is set to a value, for example, as small as several tens [kΩ] and the resistance of the second overcurrent return resistor RS2 is set to a value, for example, as large as several hundreds [kΩ] to several [MΩ], the combined resistance of the overcurrent return resistance can be switched between several tens [kΩ] and several hundreds [kΩ] to several [MΩ]. Thereby, when the voltage Vd detected at the current detection terminal V− is smaller than the threshold value Vthna of the NAND gate NA, the resistance of the overcurrent return resistor RS can be set to several tens [kΩ], and when voltage Vd is larger than the threshold value Vthna of the NAND gate NA, the resistance of the overcurrent return resistor RS can be changed into a resistance value ten times to a thousand times of the resistance value of the overcurrent return resistor RS at the time when the voltage Vd detected at the current detection terminal V− is smaller than the threshold value Vthna of the NAND gate NA. That is, the resistance of the overcurrent return resistor RS can be set to a value according to a level of the voltage Vd detected at the current detection terminal, that is, a level of the discharge overcurrent, which permits a great reduction in the leakage current Ileak flowing to the VSS terminal (GND).

Figure 4:
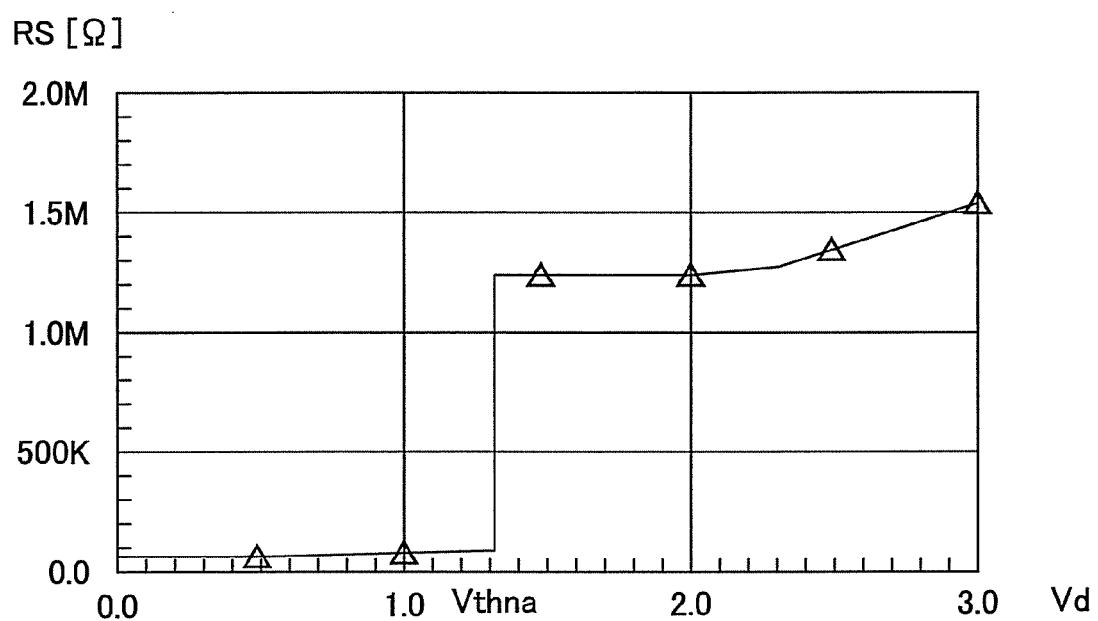
FIG. 4 is a graph indicating a relationship between a voltage detected at a current detection terminal and a resistance of the overcurrent return resistor in the overcurrent protection circuit of the rechargeable battery illustrated in FIG. 3.

FIG. 4 is a graph indicating a relationship between the voltage Vd detected at the current detection terminal V– and the resistance of the overcurrent return resistor RS in the overcurrent protection circuit 200 of the rechargeable battery CELL according to the present embodiment. In FIG. 4, the horizontal axis represents the value of the voltage Vd detected at the current detection terminal V–, and the vertical axis represents the resistance value of the overcurrent return resistor RS.

As indicated in FIG. 4, the resistance value of the overcurrent return resistor RS changes from several tens [kΩ] to more than 1.2 [MΩ] according to the value of the voltage Vd at the current detection terminal V–. The voltage at which the resistance value of the overcurrent return resistor RS changes is the threshold voltage Vthna of the NAND gate NA. That is, when the voltage Vd at the overcurrent detection terminal V– is equal to or larger than the threshold voltage Vthna of the NAND gate NA, the resistance of the overcurrent return resistor RS is a value as large as 1.2 [MΩ] or larger. On the other hand, when the voltage Vd at the overcurrent detection terminal V– is smaller than the threshold voltage Vthna of the NAND gate NA, the resistance of the overcurrent return resistor RS is as small as several tens [kΩ].

According to experiments performed by the inventor, it was found that the overcurrent protection circuit 200 of the rechargeable battery. CELL according to the present embodiment can reduce the leakage current Ileak flowing to the VSS terminal to about 4.0 microamperes (Ileak=4.0 [μA]) if the voltage at the VDD terminal is 4.0 [V] and the resistance of the overcurrent return resistor RS is 1 [MΩ] in an overcurrent protection state (DOUT=low level, Vd=P+). Because the leakage current Ileak of the conventional overcurrent protection circuit of a rechargeable battery is about 77 microamperes [μA], the leakage current Ileak of the overcurrent protection circuit 200 of the rechargeable battery CELL according to the present embodiment greatly reduces the leakage current Ileak, which provides a long service life of the rechargeable battery CELL.

Although the overcurrent return resistor connecting part 55 uses the NAND gate NA in the structure illustrated in FIG. 3, various modifications may be made for the structure of connection switching. For example, it is possible to form a structure by making a logic operation part to switch a connection to the current detection terminal V– by simply turning on one of the first MOS transistor M1 and the second MOS transistor M2. Additionally, various connection methods may be applied to the connection method of the first and second overcurrent return resistors RS1 and RS2. In the overcurrent protection circuit 200 of the rechargeable battery CELL according to the present embodiment, various methods may be used if the resistance value of the overcurrent return resistor RS can be changed according to a level of the voltage Vd detected at the current detection terminal V–.

The present invention is not limited to the specifically disclosed embodiments, and variations and modifications may be made without departing from the scope of the present invention.

What is claimed is:

1. An overcurrent protection circuit of a rechargeable battery, comprising:
a current detection terminal at which a voltage converted from a discharge current of the rechargeable battery is detected; and
an overcurrent return resistor connecting part that connects said current detection terminal to overcurrent detection resistors having different resistances in accordance with a level of the voltage detected at said current detection terminal when the voltage detected at said current detection terminal is equal to or greater than a discharge overcurrent detection voltage and a discharge overcurrent state in which an overcurrent flows from said rechargeable battery is detected,
wherein said overcurrent return resistor connecting part includes:
the first overcurrent return resistor and the second overcurrent return resistor parallel to each other and connected to said current detection terminal; and
a switching part configured to switch between a parallel connection state where said first overcurrent return resistor and said second overcurrent return resistor are connected in parallel and a single connection state where said second overcurrent return resistor is solely connected to said current detection terminal,
wherein said switching part includes:
a first switching element serially connected to said first overcurrent return resistor in a first branch circuit containing said first overcurrent return resistor;
a second switching element serially connected to said second overcurrent return resistor in a second branch circuit containing said second overcurrent return resistor; and
a logic operation part configured to turn on said first switching element and said second switching element when the voltage at said current detection terminal is equal to or smaller than a predetermined threshold voltage, and turn on said first switching element and turn off said second switching element when the voltage at said current detection terminal is greater than said predetermined threshold voltage.

2. The overcurrent protection circuit of a rechargeable battery as claimed in claim 1, wherein
said logic operation part includes a NAND gate having an output connected to a switching control input of said first switching element;
said predetermined threshold voltage is a threshold voltage of said NAND gate;
said second switching element is turned on when said discharge overcurrent state is detected, and a high-level signal is input to one input of said NAND gate; and
the voltage detected at said current detection terminal is input to another input of said NAND gate, and a high-level signal is input when the voltage detected at said current detection terminal is higher than said threshold value of said NAND gate.

3. The overcurrent protection circuit of a rechargeable battery as claimed in claim 1, wherein said second overcurrent return resistor has a resistance equal to or larger than ten times and equal to or smaller than thousand times a resistance of said first overcurrent return resistor.

4. The overcurrent protection circuit of a rechargeable battery as claimed in claim 3, wherein said switching part includes a logic operation part configured to turn on said first switching element and said second switching element when the voltage at said current detection terminal is equal to or smaller than a predetermined threshold voltage, and turn on said first switching element and turn off said second switching element when the voltage at said current detection terminal is greater than said predetermined threshold voltage.

5. The overcurrent protection circuit of a rechargeable battery as claimed in claim 4, wherein said logic operation part includes a NAND gate having an output connected to a switching control input of said first switching element;

said predetermined threshold voltage is a threshold voltage of said NAND gate;

said second switching element is turned on when said discharge overcurrent state is detected, and a high-level signal is input to one input of said NAND gate; and the voltage detected at said current detection terminal is input to another input of said NAND gate, and a high-level signal is input when the voltage detected at said current detection terminal is higher than said threshold value of said NAND gate.

* * * * *